June 16, 1959  J. M. HILL  2,890,788
MOBILE CURVABLE CONVEYORS
Filed March 8, 1955  3 Sheets-Sheet 1
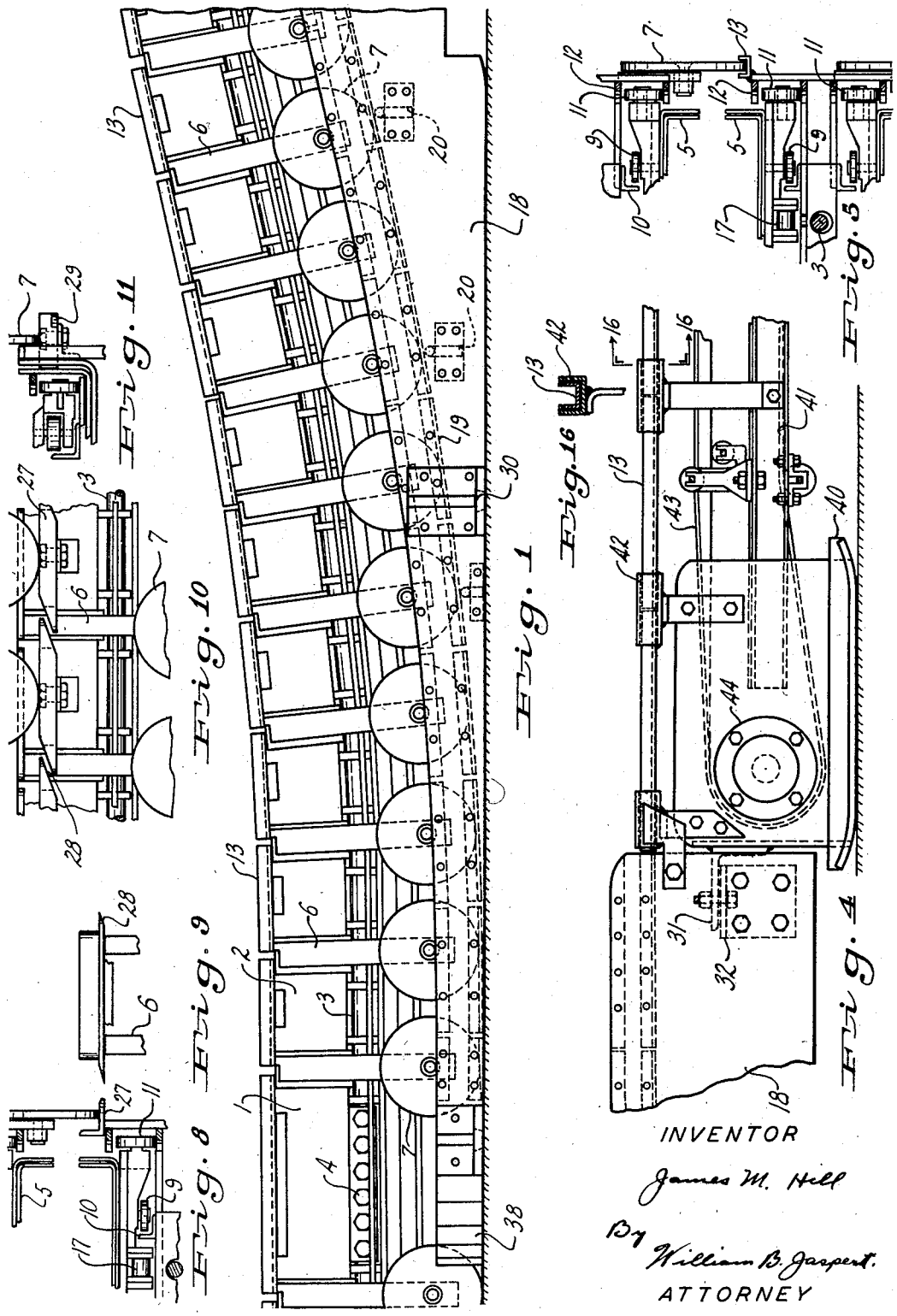
INVENTOR
James M. Hill
By William B. Jaspert.
ATTORNEY

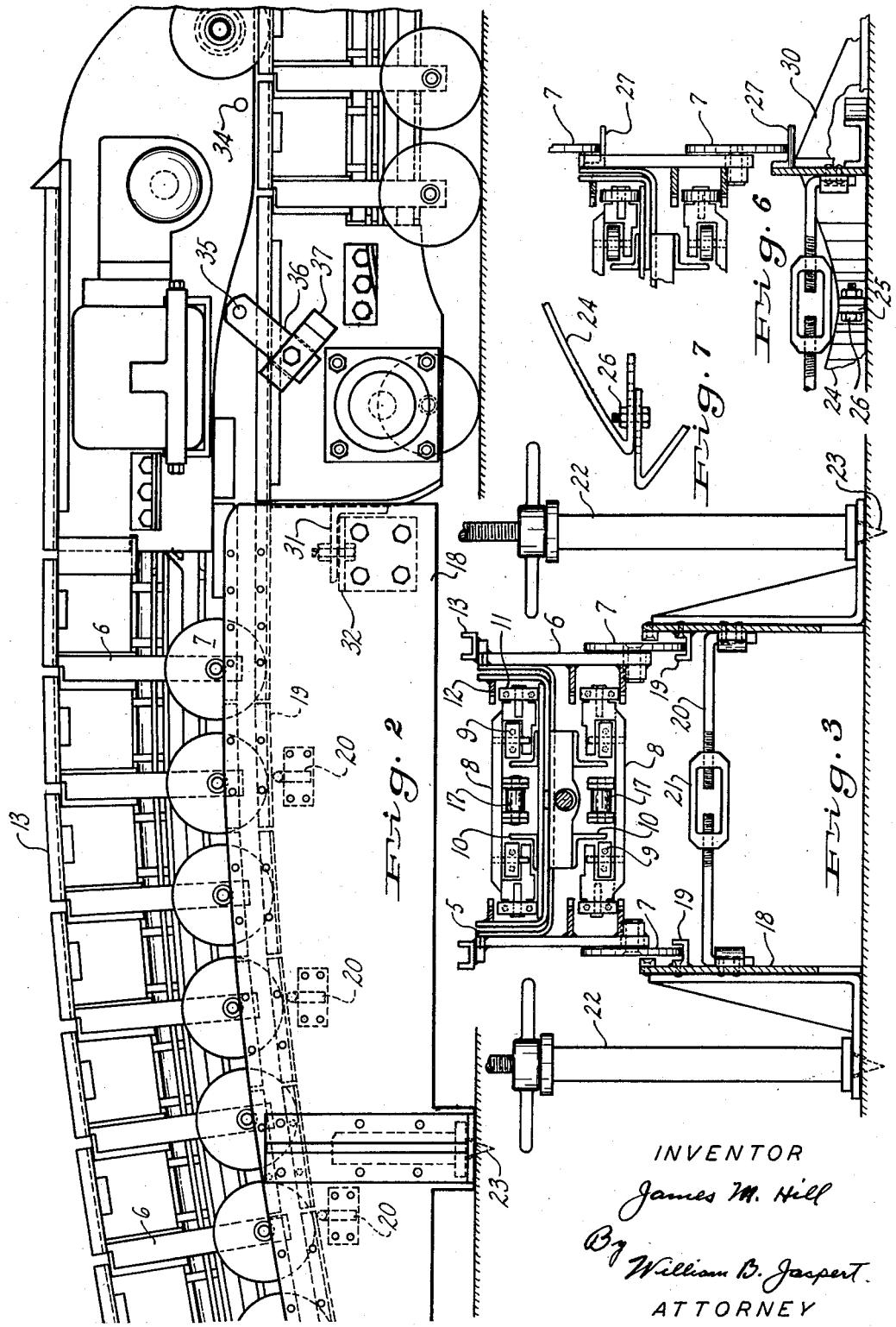

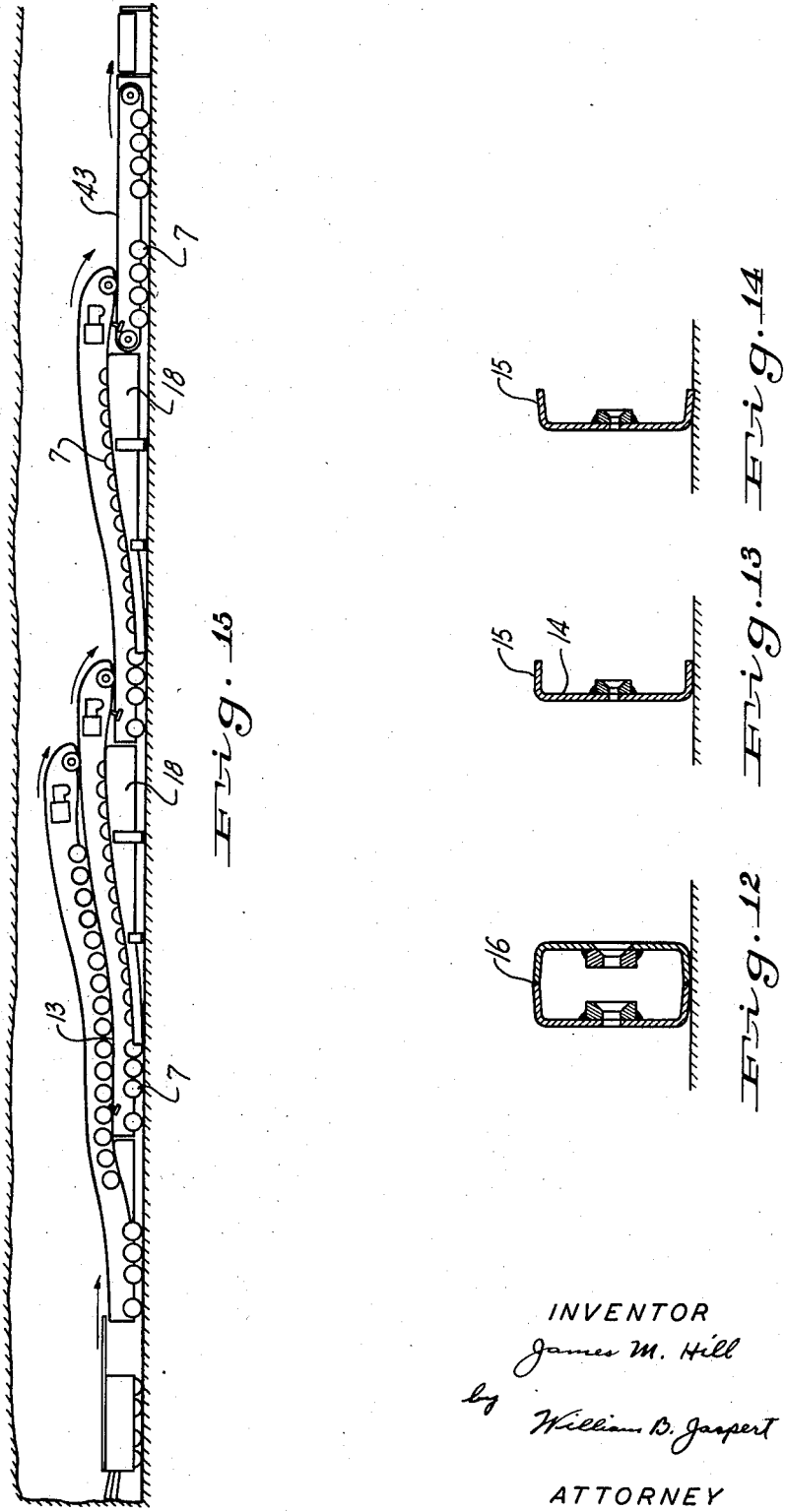

United States Patent Office 2,890,788
Patented June 16, 1959

2,890,788

MOBILE CURVABLE CONVEYORS

James M. Hill, Morgantown, W. Va.

Application March 8, 1955, Serial No. 492,921

4 Claims. (Cl. 198—89)

This invention relates to mobile curvable conveyors for delivering coal from a continuous mining machine to a standing conveyor, and it is among the objects of the invention to provide a conveyor structure comprising articulated frame or chassis sections maintained in working alignment irrespective of the curvature of the conveyor by means of a flexible draw bar as disclosed in my co-pending application, Serial No. 451,133, filed August 20, 1954, now Patent No. 2,850,147.

With reference to the particular structural features of the conveyor described and claimed in the instant case, the present application is a continuation-in-part of my application Serial No. 399,705, filed December 22, 1953, now abandoned, as well as application Serial No. 451,133, referred to above.

In accordance with the present invention, I provide a conveyor structure embodying a drive mechanism for actuating the endless conveying means at one end of the conveyor, and an inclined track element at the other end of the conveyor and tracks on top of the conveyor frame sections, whereby one conveyor can be rolled on top of another conveyor to provide a succession of conveyors ad infinitum for delivering coal from a continuous mining machine throughout any length of a mine corridor to a stationary loading conveyor.

The invention particularly deals with the construction of the conveyor elements whereby they can be superimposed piggy-back fashion and be self-aligning in their movement one upon another, and it is among the objects of the invention to provide a conveyor construction for the purpose herein stated in which the conveying means and supporting structures will function without binding or other interference by virtue of the curvature of the conveyor in its elevated or curved position on another conveyor incline.

The invention will become more apparent from a consideration of the accompanying drawings, constituting a part hereof, in which like reference characters designate like parts, and in which—

Fig. 1 is a side elevational view of a portion of a conveyor and the tail end of an incline or ramp of another conveyor;

Fig. 2 is a similar view of an extension of the conveyor of Fig. 1 and the ramp on which it is partially supported;

Fig. 3 is a vertical cross-sectional view of a conveyor mechanism supported by a ramp in position to discharge coal on a second conveyor;

Fig. 4 is a side elevational view of a portion of a stationary receiving conveyor of the common belt type with the ramp or end frame of another conveyor attached thereto;

Fig. 5 is a vertical section partially in elevation, of side portions of a pair of superposed conveyors;

Fig. 6 is a vertical cross-sectional view of a conveyor and supporting ramp structure with a modified form of track structure;

Fig. 7 is a top plan view of a pair of attaching plates for securing the ends of the flexible side plates of the conveyor ramps;

Fig. 8 is a vertical section of a portion of a conveyor with a track construction that also constitutes a fender along the sides of the conveyor;

Fig. 9 is a side elevational view of the combined track and fender portion;

Fig. 10 is a side elevational view of a plurality of frame sections embodying the track and fender element of Figs. 8 and 9;

Fig. 11 is a cross-sectional view of a fragmentary portion of the conveyor showing a modified form of track and fender structure;

Figs. 12, 13 and 14 are, respectively, vertical cross-sectional views of conveyor supporting ground wheels;

Fig. 15 is a side elevational view diagrammatically illustrating the use of multiple conveyors in accordance with the present invention; and Fig. 16 is a cross-section taken along the lines 16—16 of Fig. 4.

With reference to Figs. 1 and 2 of the drawings, the numeral 1 designates a conveyor frame section, as does the numeral 2, the latter being of substantially half of the length of the section 1, for the reason that a flexible draw bar, designated by the numeral 3, is spliced in the long sections 1 by being clamped therein, as indicated by the bolts 4. In cross section, the members 1 and 2 are the same, and consist of the body pans 5 having side columns 6 with wheels 7 by which the conveyor sections roll on the floor of a mine corridor. The body pans 5 overlap, as is more fully described and claimed in my co-pending application Serial No. 451,133, so as to form a continuous chute, or trough, through which the coal being mined is conveyed by means of drag flights, generally designated by the numeral 8, Fig. 3. These drag flights are provided with guide rollers 9 that engage angle bars 10 and guide rollers 11 that ride on the floor of the body pans and are restrained against vertical displacement by hold-down bars 12. As shown in Figs. 1 and 2, the sectional frames are provided with wheel tracks 13 which are of U-shape to receive the wheels 7, which are preferably of the special construction shown in Figs. 12, 13 and 14.

These wheels are punched out of sheet metal 14, Fig. 13, and flanged as shown at 15. The flange may be flared, as shown in Fig. 14, to provide point contact for traction on a mine floor. Two of the members 14 may be juxtaposed and joined by welding at 16 to make a double wheel where such is desired.

In the form of the device shown in Fig. 3, the drag flights are moved by means of an endless chain 17 secured at the center of the drag flights, both the load bearing and return strands of the drag flight and chain being shown in Fig. 3.

In accordance with the present invention, the ends of the conveyors may be provided with sheet metal ramps, generally designated by the numeral 18, or such ramps may be separate units that can be attached to the end of the conveyor. The ramps consist of steel side plates to which are welded U-shaped tracks 19 for receiving the wheel 7 of a conveyor. The plates 18 are connected by swivel bolts 20 coupled by a turn-buckle 21 which draws the plates to the proper position for spacing the tracks 19 with the spacing of the wheels 7. The ramps 18 may be provided with jacks 22 that engage the roof of the mine to firmly hold the ramps to the floor of the mine, the jacks being provided with spikes 23, if desired, to bight into the floor of the mine corridor.

The detailed construction of the conveyor frame sections and drag flight, or pan conveying means, is more fully disclosed in my co-pending application hereinbefore mentioned.

In Fig. 6 is shown a plurality of cross plates 24 having flanges 25 that may be secured by a bolt 26. These are at the lower end of the ramp and are shown in top plan view in Fig. 7 as being offset for the purpose of adjusting for curvature, if such exists, at the place where the ramp is located. Also in Fig. 6 is shown a modified form of track which consists of angle bars 27 on which the wheels 7 roll, such angle bars being provided in place of the U-shaped tracks 13 of the conveyor and the tracks 19 of the ramp, as shown in Fig. 3.

A further modification of tracks is shown in Figs. 8 through 11 as being chamfered at the ends 28 to give freedom of articulation and overlap to the frame sections. In Fig. 11, the wheel tracks are provided with a fender 29 to prevent binding of the conveyor on the walls of the mine corridor and to protect the conveyor equipment in case of contact with the walls.

As shown in Figs. 1 and 6, the ramps are provided with flanges 30 to properly reinforce the side walls thereof, and the swing bolts and turn-buckles 20 and 21 are used in multiples adjacent the top edge of the ramp walls, as shown in Figs. 1 and 2.

In Fig. 2 the tail-end of a conveyor is shown hitched to an incline, or ramp, by means of an angle bracket 31 by which it is fastened to a cross plate 32 of the ramp 18. Also, the head or drive end of the conveyor 33 is provided with pin holes 34 for receiving a pin 35 holding a plate 36 that fits into an offset lug 37 of the conveyor end, whereby the ends of the conveyor may be coupled when they are in their extended position. As stated before, the ramps 18 may be separately utilized or attached to the conveyor, as the case may be. The ramps are provided with flared ends 38, Fig. 1, which guide the wheels 7 of the conveyor as they ride onto the track 19 of the ramp.

As shown in Fig. 15, a series of conveyors are mounted in superposed relation for conveying coal from a continuous mining machine 39 to a stationary belt conveyor shown in Fig. 4, this belt conveyor being of a conventional type. The belt conveyor is mounted on skids 40 and is provided with a frame 41 and 42 in which an endless conveyor belt 43 travels over an end pulley 44. Tracks 13 are provided on the top of the belt conveyor frame. As shown in Fig. 4, the large end of a ramp 18 is coupled to the stationary belt conveyor by means of the angle bracket 31 and plate 32 so that the end conveyor that rides to the top of the ramp 18 will deliver the coal to the belt 43 of the stationary conveyor which receives the coal as it is being continuously mined.

In the use of the above-described conveyors, the overlapping wheel tracks 13 at the top of the conveyor frame sections constitute a continuous track for the wheels 7 of a superposed conveyor and conform to the curvature of the mine corridor or digging by employment of the flexible draw bar 3 which, by being attached to the frame sections at intervals, functions much like the vertibrae of a reptile. In other words, there can be no abrupt angling of the frame sections to disrupt the curvature of the tracks which is controlled by the flexible draw bar and the wheels of the upper conveyor will follow smoothly in the tracks 13, either on tangents or curves.

By the employment of the connecting ramps, movement of one conveyor on the tracks of another is facilitated by the flared ends of the ramp walls at the floor level of the mine and by attaching the high end of the ramps to the head end of the conveyors, proper alignment of successive conveyors without possibility of displacement is assured.

The construction of the ramp lends itself to rapid assembly and ease of adjustment to track gage and by means of roof jacks they may be positively anchored in their working position.

It is evident from the foregoing description of this invention that the conveyor structure herein described is particularly adapted for continuous mining machine operation without serious interruption, except for the placement of additional conveyors as they are needed. Such conveyors are simply run up on the ramps over the preceding conveyor and as the mining machine moves forward, the conveyor will move downward on the ramp and continuously deliver coal to the conveyor flights or pans underneath.

Although several embodiments of the invention have been herein illustrated and described, it will be evident to those skilled in the art that various modifications may be made in the details of construction without departing from the principles herein set forth.

I claim:

1. In a conveyor system for loading coal from a mining machine, a conveyor support and guide comprising a plurality of frame sections mounted on wheeled supports and having wheel tracks on the top at the sides thereof constituting the top of each frame section a track section for a second conveyor, an endless conveyor movable over said frame sections, and a unitary draw bar extending from a mining machine and passing through all of said frame sections in contact therewith to guide said frame sections in the direction of travel of said mining machine, said frame sections being of a length to conform their track sections to the curvature of said draw bar by tension of said draw bar.

2. In a conveyor system for loading coal from a mining machine, a conveyor support and guide comprising a plurality of frame sections mounted on wheeled supports and having wheel tracks on the top at the sides thereof constituting the top of each frame section a track section for a second conveyor, an endless conveyor movable over said frame sections, and a unitary draw bar extending from a mining machine and passing through all of said frame sections in contact therewith to guide said frame sections in the direction of travel of said mining machine, said frame sections being of a length to conform their track sections to the curvature of said draw bar by tension of said draw bar, said draw bar being disposed at substantially the vertical and transverse centers of said frame sections.

3. In a conveyor system for loading coal from a mining machine, a conveyor support and guide comprising a plurality of frame sections mounted on wheeled supports and having wheel tracks on the top at the sides thereof constituting the top of each frame section a track section for a second conveyor, an endless conveyor movable over said frame sections, and a unitary draw bar extending from a mining machine and passing through all of said frame sections in contact therewith to guide said frame sections in the direction of travel of said mining machine, said frame sections being of a length to conform their track sections to the curvature of said draw bar by tension of said draw bar, said draw bar being disposed at substantially the vertical and transverse centers of said frame sections and being fastened to some of said sections including both end sections and supporting all of said sections.

4. In a conveyor system for loading coal from a mining machine, a plurality of conveyors each consisting of a conveyor support and guide comprising a plurality of frame sections mounted on wheeled supports and having wheel tracks on the top at the sides thereof constituting the top of each frame section a track section, an endless conveyor movable over said frame sections, and a unitary draw bar extending from end to end of said frame sections and passing through all of said frame sections in contact therewith to guide said frame sections in the direction of travel of said conveyors, said frame sections being of a length to conform the track sections to the curvature of said draw bar by tension of said draw bar, said conveyors having a ramp at the tail end with tracks constituting an extension of said rail sections and having a drive unit at the other end to actuate said conveyor, one of said conveyors being adapted to roll up the ramp and over the rail sections of the other similar conveyor.

(References on following page)

References Cited in the file of this patent

UNITED STATES PATENTS

| | | |
|---|---|---|
| 1,249,239 | Suffolk | Dec. 4, 1917 |
| 1,550,239 | Billings et al. | Aug. 18, 1925 |
| 1,826,853 | Williams et al. | Oct. 13, 1931 |
| 2,242,206 | Bisset | May 20, 1941 |
| 2,250,933 | Manierre | July 29, 1941 |
| 2,420,009 | Osgood | May 6, 1947 |
| 2,525,555 | Manierre | Oct. 10, 1950 |
| 2,543,518 | Baechli | Feb. 27, 1951 |
| 2,595,533 | Mullen et al. | May 6, 1952 |

FOREIGN PATENTS

| | | |
|---|---|---|
| 361,022 | Germany | Oct. 9, 1922 |
| 611,784 | Great Britain | Nov. 3, 1948 |
| 626,773 | Germany | Mar. 2, 1936 |
| 666,702 | Great Britain | Feb. 20, 1952 |
| 675,256 | Great Britain | July 9, 1952 |
| 902,569 | France | Sept. 4, 1945 |